Patented May 16, 1950

2,507,551

UNITED STATES PATENT OFFICE 2,507,551

SILAHYDROCARBONS AND THEIR PREPARATION

Leo H. Sommer, State College, Pa., assignor to Dow Corning Corporation, Midland, Mich., a corporation of Michigan No Drawing. Application March 19, 1949, Serial No. 82,469

4 Claims. (Cl. 260—448.2)

The present invention relates to new organosilicon compositions and to their production.

The present organosilicon industry is based upon siloxanes which are materials in which the silicon atoms are linked through oxygen atoms. Another type of silicon compound is one in which the silicon atoms are linked directly to each other. Still a third type is one in which the silicon atoms are linked by organic radicals. The literature presents very little information concerning this third type of compound.

The compositions of the present invention have the formulae $$[(CH_3)_3SiCH_2]_4Si$$
and
$$[(CH_3)_3SiCH_2]_3SiCl$$

This compound may be prepared by reacting either $(CH_3)_3SiCH_2Li$ or $(CH_3)_3SiCH_2MgCl$ with a silicon tetrahalide.

The organolithium compound and the Grignard reagent may be prepared from $(CH_3)_3SiCH_2Cl$. This compound, $(CH_3)_3SiCH_2Cl$, may be prepared in a number of ways. It may be prepared by the direct chlorination of tetramethylsilane as described in the literature, or it may be prepared by chlorinating trimethylchlorosilane, which may then be reacted with a methyl Grignard to give $(CH_3)_3SiCH_2Cl$.

The lithium used to prepare the organolithium compound should be in a finely divided state to assure complete reaction.

The product $[(CH_3)_3SiCH_2]_4Si$ has a boiling point of 146° to 154° C. at 23 mm. and a melting point of 28.5° C. and the product, $$[(CH_3)_3SiCH_2]_3SiCl$$

has a boiling point of 112° C. at 4 mm. absolute pressure.

The reaction of $$(CH_3)_3SiCH_2Li$$
or
$$(CH_3)_3SiCH_2MgCl$$

with silicon tetrachloride produces both $$[(CH_3)_3SiCH_2]_4Si$$
and
$$[(CH_3)_3SiCH_2]_3SiCl$$

At least 3 mols of the organometallic reactant should be employed per mol of the silicon tetrachloride. In order to promote high proportionate yield of the former it is desirable to employ over four mols of that reactant per mol of the silicon tetrachloride. The reaction in accord herewith may be carried out by the gradual addition of the silicon tetrachloride to the organolithium or Grignard reagent which may be dissolved or suspended in any suitable organic solvent such as pentane. The resulting product may be purified by filtering and distilling if desired.

The reaction in accord herewith may be carried out at room temperature or above. Increasing the temperature results in increasing the rate of reaction and the proportionate yield of the tetrasubstituted product. At about 38° C. the product is primarily $[(CH_3)_3SiCH_2]_3SiCl$. If the temperature is raised to 90° C., the reaction gives a large proportion of the tri-substituted material, $[(CH_3)_3SiCH_2]_3SiCl$ with an increased but small proportion of $[(CH_3)_3SiCH_2]_4Si$. At 150° C. the product is primarily tetrasubstituted. It is preferred to operate at a temperature below 250° C. and in liquid phase.

The tetrasubstituted composition of the present invention has utility as a hydraulic or damping fluid, heat transfer medium, and as a dielectric liquid. This composition is also useful as an intermediate in the preparation of other organosilicon compositions. The trisubstituted compositions described are of utility for end-blocking dimethylpolysiloxanes for the production of stable fluids.

The following examples illustrate the method of the present invention.

Example 1

Lithium sand in amount of 25 parts by weight was first prepared by mixing lithium and mineral oil, beating the lithium into fine particles, and siphoning off the mineral oil. 504.8 parts of pentane were added and $(CH_3)_3SiCH_2Cl$ added gradually. A 95% yield of the organolithium compound, $(CH_3)_3SiCH_2Li$ was obtained.

Silicon tetrachloride in amount of 28 parts was gradually added over a period of one hour to 112.8 parts of the organolithium compound dissolved in pentane and refluxed for 24 hours. The solvent was then removed gradually over a period of 6 hours, raising the temperature to 90° C. Dry nitrogen was next introduced into the system and the temperature held at 150° C. for 12 hours. The reaction mixture was poured onto cracked ice, and the layers separated. There was a yield of 21.3 parts (32%) of the product $$[(CH_3)_3SiCH_2]_4Si$$

which product had a boiling point of 146° to 154° C. at 23 mm., and a melting point of 28.5° C.

Other material obtained in small proportion appeared to be [(CH$_3$)$_3$SiCH$_2$]$_3$SiCl.

*Example 2*

To 141 parts by weight of (CH$_3$)$_3$SiCH$_2$Li in 378.6 parts of pentane there was gradually added over a period of 1 hour, 30 parts of SiCl$_4$. The mixture was heated under reflux and stirred overnight. Pentane was removed gradually from the solution, raising the temperature from 38° to 75° C. The mixture was heated and stirred at 75° C. overnight. On cooling 252.4 parts of pentane were added. The reaction mixture was then poured onto cracked ice. The layers were separated and the water layer extracted twice with 126.2 parts of pentane. The pentane was then removed. Fractional distillation yielded

[(CH$_3$)$_3$SiCH$_2$]$_3$SiCl and [(CH$_3$)$_3$SiCH$_2$]$_4$Si.

*Example 3*

The procedure of Example 2 was repeated but without increasing the reaction temperature from that of refluxing pentane. The product

[(CH$_3$)$_3$SiCH$_2$]$_3$SiCl was obtained.

*Example 4*

A Grignard reagent, (CH$_3$)$_3$SiCH$_2$MgCl, was prepared from the reaction of 50 parts by weight of magnesium and 245 parts of (CH$_3$)$_3$SiCH$_2$Cl in ether solution. 70 parts of SiCl$_4$ in ether was then added with stirring to the Grignard reagent. The mixture was stirred for 12 hours and refluxed for an additional 12 hours. The ether was distilled, the residue heated at 100° C. for 12 hours and at 150° C. for 4 hours. The solid residue was decomposed with ammonium chloride and concentrated HCl in water. The layers were separated and the water layer was extracted with ether. The ether layer and extracts were combined and washed with water and saturated potassium carbonate, and dried over sodium sulfate. The ether was distilled and the residue fractionally distilled. There was obtained

[(CH$_3$)$_3$SiCH$_2$]$_3$SiCl with traces of [(CH$_3$)$_3$SiCH$_2$]$_4$Si. The compound [(CH$_3$)$_3$SiCH$_2$]$_3$SiCl has a boiling point of 112° C. at 4 mm. absolute pressure, a refractive index of 1.4600 and a density at 20° C. of 0.8900.

That which is claimed is:

1. [(CH$_3$)$_3$SiCH$_2$]$_4$Si.

2. The method which comprises reacting a compound of the group consisting of (CH$_3$)$_3$SiCH$_2$MgX and (CH$_3$)$_3$SiCH$_2$Li with SiCl$_4$ in liquid phase with there being present at least three mols of the former per mol of the latter, whereby

[(CH$_3$)$_3$SiCH$_2$]$_4$Si is produced.

3. The method which comprises reacting (CH$_3$)$_3$SiCH$_2$Li with SiCl$_4$ in liquid phase with there being present at least three mols of the former per mol of the latter, whereby

[(CH$_3$)$_3$SiCH$_2$]$_4$Si is produced.

4. [(CH$_3$)$_3$SiCH$_2$]$_3$SiCl.

LEO H. SOMMER.

REFERENCES CITED

The following references are of record in the file of this patent:

Whitmore et al.: "Jour. Am. Chem. Soc.," vol. 68 (1942), pages 481–484.